United States Patent [19]

Haruki

[11] Patent Number: 5,036,400
[45] Date of Patent: Jul. 30, 1991

[54] AUTOMATIC IRIS CORRECTION APPARATUS FOR USE IN AUTOMATICALLY ADJUSTING EXPOSURE IN RESPONSE TO A VIDEO SIGNAL

[75] Inventor: Toshinobu Haruki, Shijonawate, Japan

[73] Assignee: Sanyo Electric Co., Ltd., Japan

[21] Appl. No.: 562,654

[22] Filed: Aug. 3, 1990

Related U.S. Application Data

[62] Division of Ser. No. 294,866, Jan. 9, 1989.

[30] Foreign Application Priority Data

Jan. 12, 1988 [JP] Japan .................................. 63-4344
Feb. 15, 1988 [JP] Japan .................................. 63-43711

[51] Int. Cl.$^5$ ......................... H04N 5/238; G03B 7/08
[52] U.S. Cl. ..................................... 358/228; 354/432
[58] Field of Search .................... 358/228, 213.19; 354/432

[56] References Cited

U.S. PATENT DOCUMENTS

| | | | |
|---|---|---|---|
| 4,050,085 | 9/1977 | Prince et al. | 358/219 |
| 4,306,787 | 12/1981 | Fukuhara et al. | 354/31 |
| 4,409,620 | 11/1983 | Enomoto | 358/228 |
| 4,429,969 | 2/1984 | Saegusa | 354/414 |
| 4,443,080 | 4/1984 | Saegusa | 354/432 |
| 4,476,383 | 10/1984 | Fukuhara et al. | 354/432 |
| 4,516,172 | 5/1985 | Miyata et al. | 358/228 |
| 4,638,365 | 1/1987 | Kato | 358/228 |
| 4,843,476 | 6/1989 | Fuyioka et al. | 358/228 |

FOREIGN PATENT DOCUMENTS

| | | |
|---|---|---|
| 57-41079 | 3/1982 | Japan . |
| 62-110369 | 5/1987 | Japan . |
| 62-296673 | 12/1987 | Japan . |

Primary Examiner—James J. Groody
Assistant Examiner—Wendy R. Greening
Attorney, Agent, or Firm—Peter L. Michaelson

[57] ABSTRACT

In an image sensing apparatus such as a video camera, an evaluating value for exposure control and determination of a gamma correction value is computed in response to a video signal obtained by an image sensing device for each of a plurality of sampling areas in a sensed image. When an evaluating value which exceeds an allowable range with respect to a predetermined reference value is included in the evaluating values, it is determined that an abnormal luminance portion exists in the corresponding sampling area, so that weighting of the evaluating value is decreased, whereby the effect of such an area on exposure adjustment is restrained. In addition, the picture contrast is computed from the ratio of the maximum value to the minimum value of the evaluating values, whereby the most suitable gamma correction value is determined based on this picture contrast.

8 Claims, 12 Drawing Sheets

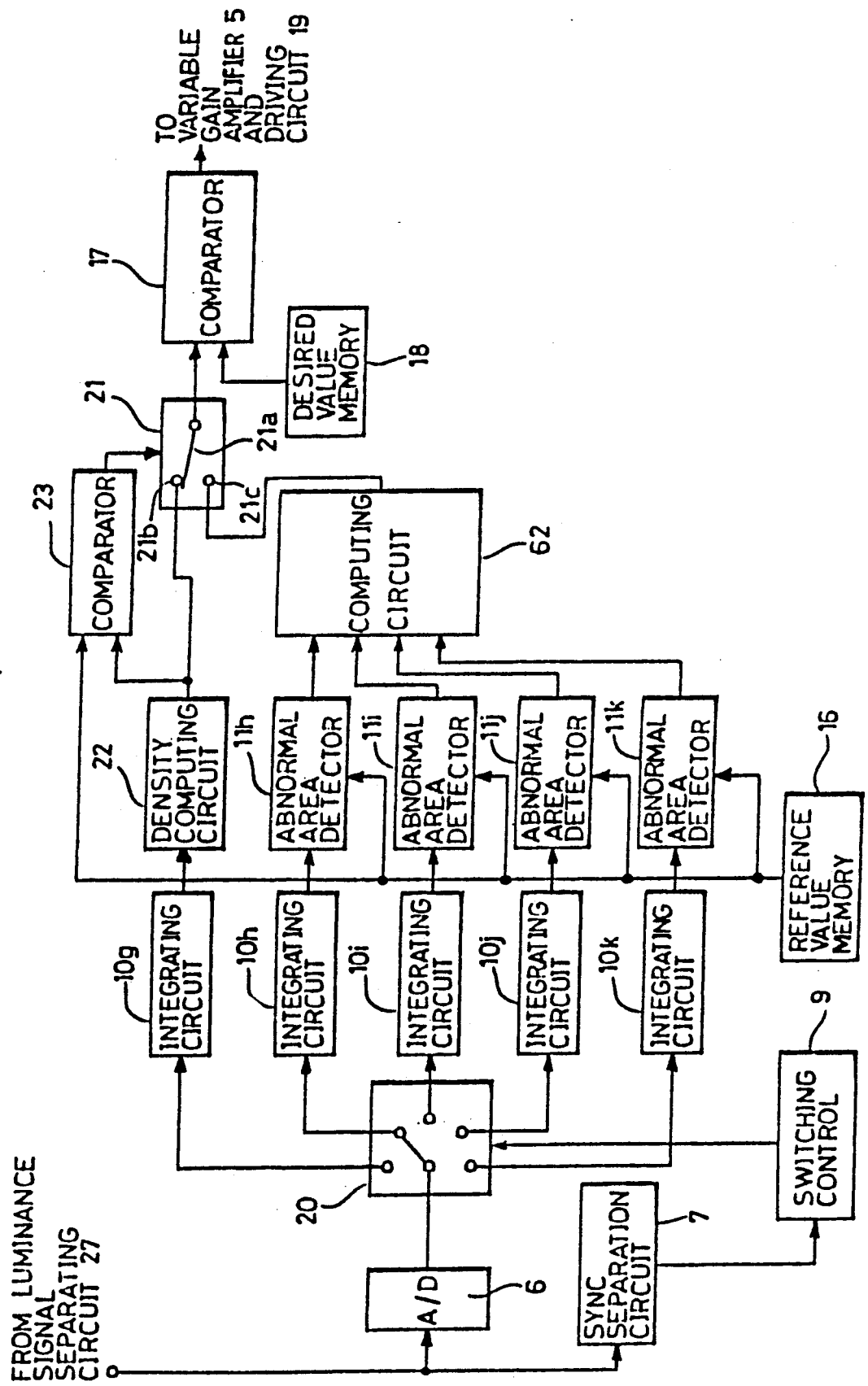

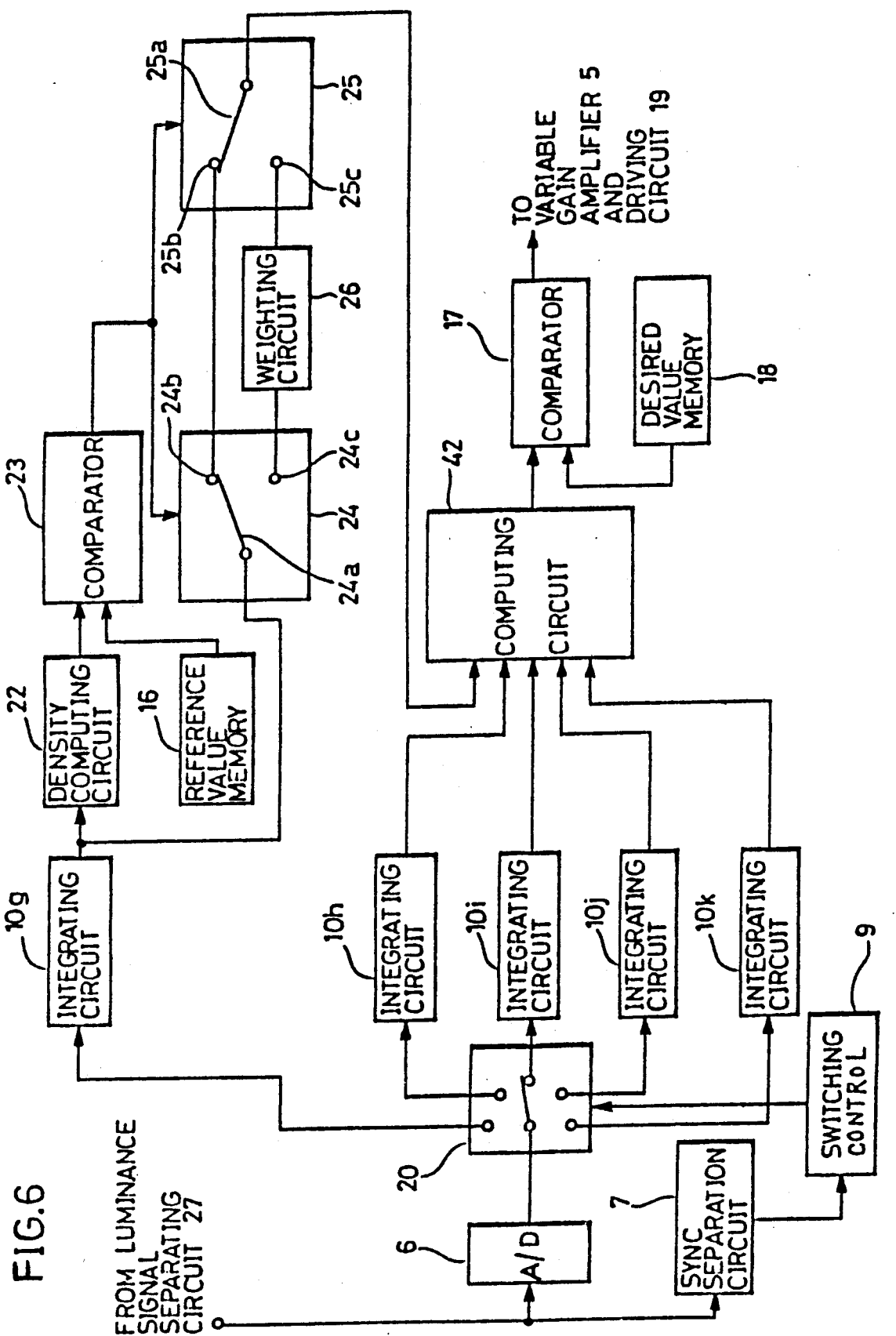

AUTOMATIC IRIS CORRECTION APPARATUS FOR USE IN AUTOMATICALLY ADJUSTING EXPOSURE IN RESPONSE TO A VIDEO SIGNAL

CROSS REFERENCE TO RELATED APPLICATION

This application is a division of my co-pending patent application Ser. No. 07/294,866 filed on Jan. 9, 1989.

BACKGROUND OF THE INVENTION

1. Field of the Invention

The present invention relates generally to an auto iris/gamma correction apparatus and an image sensing apparatus comprising such an auto iris/gamma correction apparatus, and more particularly, to an apparatus for automatically making exposure adjustment and/or gamma correction in response to a video signal obtained from an image sensor and an image sensing apparatus such as a video camera comprising such an auto iris/-gamma correction apparatus.

2. Description of the Background Art

Conventionally, an image sensing apparatus such as a video camera having a function of automatically adjusting exposure in response to a video signal obtained from an image sensor, i.e., a so-called auto iris function has been put into practice. Such a conventional auto iris system mainly includes two types: a system of mechanically adjusting exposure by adjusting an optical iris of a lens and a system of electrically adjusting exposure by adjusting the amplification factor of an amplifier for amplifying a level of a video signal obtained from an image sensor.

However, such a conventional auto iris system has the following disadvantages: When a high luminance portion such as a light source is included in a picture, for example, the size of the aperture of the diaphragm is decreased, so that the gain of the entire picture is decreased, whereby a major object becomes insufficiently bright. On the contrary, when the background is very dark, the size of the aperture of the diaphragm is increased, so that the gain of the entire picture is increased, whereby the major object becomes too bright.

An exposure correcting method for eliminating such disadvantages has been proposed in, for example, Japanese Patent Laying-Open Gazette No. 110369/1987. In this exposure correcting method, in view of the fact that a major object is arranged in the center of the picture in many cases, a picture is divided into a central region and a peripheral region; a signal level of a video signal obtained from an image sensor in each region is detected as an evaluating value, and the evaluating value in the central region is weighted with respect to the evaluating value in the peripheral region (in the extreme case, the central region "1" while the peripheral region "0"). The size of the aperture of the diaphragm and the amplification gain of the video signal are controlled according to the ratio of both the evaluating values, so that contribution of the central region in the picture to the determination of exposure is increased.

Hence, in such an exposure correcting method, an auto iris operation most suitable for the change in brightness of the entire picture is ensured. However, when a high luminance portion is included only in the central region or an object of extremely high luminance such as the sun is included only in the peripheral region, for example, the size of the aperture of the diaphragm is decreased so that the gain of the entire picture is decreased, whereby a major object becomes insufficiently bright.

On the other hand, Japanese Patent Laying-Open Gazette No. 41079/1982 for example discloses a method in which a picture is divided into a plurality of regions, and a region which is an object of exposure adjustment is manually selected by a user so that exposure adjustment is made in response to only a video signal in the region. However, it is very troublesome for the user to always select such region by manual operation. Furthermore, this method is for selecting an object region not by the objective judgement based on a video signal obtained from an image sensor but by the subjective judgement of the user. Thus, with such a method, it is difficult to perform automatic exposure control with high precision Meanwhile, in an image sensing apparatus such as a video camera, it is important to obtain the brightness suitable for an object, i.e., a suitable level of a luminance signal obtained from an image sensor, as described above. Such a level of the luminance signal includes the average brightness in a picture, i.e., an absolute level of the luminance signal obtained from an image sensor and the contrast of the picture, i.e., a relative level thereof.

The former is suitably adjusted by an auto iris operation such as adjustment of an optical iris and control of the amplification gain of a video signal as described above, while the latter is suitably adjusted by a gamma ($\gamma$) correction system as described below.

This gamma correction will be described in detail. In general, a dynamic range of the present image sensor (approximately 40 dB) is much smaller than a dynamic range of the luminance of an object (approximately 100 dB), and a dynamic range of a display device such as a CRT (Cathode Ray Tube) is almost the same as or smaller than that of the image sensor (approximately 30 to 40 dB). Thus, even if the brightness of a picture, i.e, an absolute level of a luminance signal is controlled, a high luminance portion in the picture is saturated and a low luminance portion therein is blackened all over, so that it is difficult to obtain the brightness suitable for the entire object.

In an ordinary image sensing apparatus, gamma correction of a luminance signal is made in a circuit on the side of a camera such that overall gamma characteristics of an entire system, including all devices from an image sensor to a display device, based on photoelectric conversion characteristics (gamma characteristics) of the image sensor and nonlinear photoelectric conversion characteristics of the display device is always 1.

However, considering a case in which a high luminance portion such as the sun exists in a picture, for example, resulting in a backlight state, so that the contrast of the picture is significantly increased, if a gamma correction value on the side of a camera remains fixed, the brightness suitable for an object can not be obtained. Therefore, a technique has been proposed in which a plurality of gamma correction circuits respectively having different gamma correction values are provided and the gamma correction value is gradually changed as required.

However, by such a technique, a user of a camera manually operates a switch (so-called backlight switch) by the subjective judgement in the backlight state to select a correction circuit having a small gamma correction value, to maintain brightness most suitable for an object. More specifically, this technique is not automatically used by the objective judgement based on a video signal obtained from an image sensor, whereby it is difficult to perform gamma correction with high precision. In addition, it is also troublesome for the user to always select such suitable gamma correction value by manual operation.

Additionally, the above described conventional auto iris mechanism and gamma correction mechanism are independent of each other. Thus, if an image sensing apparatus is simultaneously equipped with these mechanisms, the image sensing apparatus becomes very complicated from the viewpoint of a mechanism and a circuit.

SUMMARY OF THE INVENTION

Therefore, an object of the present invention is to provide an auto iris apparatus in which the brightness most suitable for a major object can be ensured by objective and automatic exposure control even if an abnormal luminance portion is partially included in an image sensed picture.

Another object of the present invention is to provide a gamma correction apparatus in which the brightness most suitable for an object can be ensured by objective and automatic determination of a gamma correction value even if the contrast of a image sensed picture is significantly increased.

Still another object of the present invention is to provide an auto iris/gamma correction apparatus capable of simultaneously performing an auto iris operation and determining a gamma correction value by using in common a video signal obtained from an image sensor.

A further object of the present invention is to provide an image sensing apparatus in which the brightness most suitable for a major object can be ensured by objective and automatic exposure control even if an abnormal luminance portion is partially included in an image sensed picture.

A still further object of the present invention is to provide an image sensing apparatus in which the brightness most suitable for an object can be ensured by objective and automatic determination of a gamma correction value even if the contrast of an image sensed picture is significantly increased.

A still further object of the present invention is to provide an image sensing apparatus capable of simultaneously performing an auto iris operation and determining a gamma correction value by using in common a video signal obtained from an image sensor.

Briefly stated, the present invention is directed to an auto iris apparatus for automatically adjusting exposure to an object in response to a video signal obtained from image sensing means, which comprises means for changing exposure to the object; means for setting a plurality of sampling areas on an image sensed picture in a time-divisional manner of a video signal; exposure evaluating value detecting means for detecting a level of a luminance signal in a video signal in each of the plurality of the sampling areas to supply the same as an exposure evaluating value in the corresponding sampling area ; computing means for weighting with a predetermined weight each of the exposure evaluating values supplied from the exposure evaluating value detecting means and computing an exposure evaluating value representing an entire image sensed picture based on the weighted exposure evaluating values; exposure control means for controlling the exposure changing means such that an output of the computing means coincides with a predetermined desired value; means for decreasing, when an exposure evaluating value exceeding a predetermined allowable range with respect to a reference value is included in the exposure evaluating values supplied from the exposure evaluating value detecting means, weighting of the exposure evaluating values in making the computation by the computing means.

In accordance with another aspect of the present invention, an auto iris apparatus for automatically adjusting exposure to an object comprises means for changing exposure to the object, means for setting a plurality of sampling areas on an image sensed picture in a time-divisional manner of the video signal, exposure evaluating value detecting means for detecting a level of a luminance signal in a video signal in each of the plurality of sampling areas, to supply the same as an exposure evaluating value in the corresponding sampling area, computing means for weighting with a predetermined first weight the exposure evaluating value corresponding to a particular sampling area out of the exposure evaluating values supplied from the exposure evaluating value detecting means, weighting with a second weight smaller than the first weight each of the exposure evaluating values corresponding to the other sampling areas, and computing an exposure evaluating value representing the entire image sensed picture based on the weighted exposure evaluating values, means for controlling the exposure changing means such that an output of the computing means coincides with a predetermined desired value, means for computing a value based on the sum of the exposure evaluating values supplied from the exposure evaluating value detecting means as a reference value, and means for changing the predetermined desired value according to the relation between the exposure evaluating value corresponding to the particular sampling area and the reference value.

In accordance with still another aspect of the present invention, a gamma correction apparatus for automatically performing gamma correction of a video signal comprises means having a plurality of gamma correction values for performing gamma correction of a video signal according to the gamma correction value selected from the plurality of gamma correction values; means for setting a plurality of sampling areas on an image sensed picture in a time-divisional manner of the video signal; evaluating value detecting means for detecting a level of a luminance signal in the video signal in each of the plurality of sampling areas to supply the same as an evaluating value in the corresponding sampling area; means for computing a value indicating the contrast of the image sensed picture based on the evaluating values outputted from the evaluating value detecting means; and means for determining any one of the plurality of the gamma correction values of the gamma correction means based on the value indicating the contrast of the image sensed picture.

In accordance with yet still another aspect of the present invention, an auto iris/gamma correction apparatus for automatically adjusting exposure to an object and automatically performing gamma correction of a video signal comprises means for changing exposure to the object; means having a plurality of gamma correction values for performing gamma correction of the video signal according to the gamma correction values selected from the plurality of gamma correction values; means for setting a plurality of sampling areas on an image sensed picture in a time-divisional manner of the video signal; means for detecting a level of a luminance signal in a video signal in each of the plurality of sampling areas to supply the same as an evaluating value in the corresponding sampling area; computing means for computing an evaluating value representing the entire image sensed picture based on the evaluating values supplied from the evaluating value detecting means; exposure control means for controlling the exposure changing means such that an output of the computing means coincides with a predetermined desired value; means for computing a value indicating the contrast of the image sensed picture based on the evaluating values outputted from the evaluating value detecting means; and means for determining any one of the plurality of gamma correction values of the gamma correction means based on the value indicating the contrast of the image sensed picture.

In accordance with yet still another aspect of the present invention, an image sensing apparatus for automatically adjusting exposure to an object comprises image sensing means having a lens and an image sensor for generating a video signal in response to incident light from the object; means for changing the exposure to the object; means for setting a plurality of sampling areas on an image sensed picture in a time-divisional manner of the video signal; exposure evaluating value detecting means for detecting a level of a luminance signal in a video signal in each of the plurality of sampling areas to supply the same as an exposure evaluating value in the corresponding sampling area; computing means for weighting each of the exposure evaluating values supplied from the exposure evaluating value detecting means with a predetermined weight and computing an exposure evaluating value representing the entire image sensed picture based on the weighted exposure evaluating values; exposure control means for controlling the exposure changing means such that an output of the computing means coincides with a predetermined desired value; and means for decreasing, when an exposure evaluating value exceeding a predetermined allowable range with respect to a reference value is included in the exposure evaluating values supplied from the exposure evaluating value detecting means, weighting of the exposure evaluating value in making computation by the computing means.

In accordance with a further aspect of the present invention, an image sensing apparatus for automatically adjusting exposure to an object comprises image sensing means having a lens and an image sensor for generating a video signal in response to incident light from the object, means for changing exposure to the object, means for setting a plurality of sampling areas on an image sensed picture in a time-divisional manner of the video signal, exposure evaluating value detecting means for detecting a level of a luminance signal in a video signal in each of the plurality of sampling areas, to supply the same as an exposure evaluating value in the corresponding sampling area, computing means for weighting with a predetermined first weight the exposure evaluating value corresponding to particular sampling area out of the exposure evaluating values supplied from the exposure evaluating value detecting means, weighting with a second weight smaller than the first weight each of the exposure evaluating values corresponding to the other sampling areas, and computing an exposure evaluating value representing the entire image sensed picture based on the weighted exposure evaluating values, means for controlling the exposure changing means such that an output of the computing means coincides with a predetermined desired value, means for computing a value based on the sum of the exposure evaluating values supplied from the exposure evaluating value detecting means as a reference value, and means for changing the predetermined desired value according to the relation between the exposure evaluating value corresponding to the particular sampling area and the reference value.

In accordance with a still further aspect of the present invention, an image sensing apparatus for automatically performing gamma correction of a video signal comprising an image sensing means having a lens and an image sensor for generating a video signal in response to incident light from an object; means having a plurality of gamma correction values for performing gamma correction of the video signal according to the gamma correction value selected from the plurality of gamma correction values; means for setting a plurality of sampling areas on an image sensed picture in a time-divisional manner of the video signal evaluating value detecting means for detecting a level of a luminance signal in the video signal in each of the plurality of sampling areas to supply the same as an evaluating value in the corresponding sampling area; means for computing a value indicating the contrast of the image sensed picture based on the evaluating values outputted from the evaluating value detecting means; and means for determining any one of the plurality of gamma correction values of the gamma correction means based on the value indicating the contrast of the image sensed picture.

In accordance with a still further aspect of the present invention, an image sensing apparatus for automatically adjusting exposure to an object and performing gamma correction of the video signal comprises image sensing means having a lens and an image sensor for generating a video signal in response to incident light from an object; means for changing exposure to the object; means having a plurality of gamma correction values for performing gamma correction of the video signal according to the gamma correction value selected from the plurality of gamma correction values; means for setting a plurality of sampling areas on an image sensed picture in a time divisional manner of the video signal; evaluating value detecting means for detecting a level of a luminance signal in a video signal in each of the plurality of sampling areas to supply the same as an evaluating value in the corresponding sampling area; computing means for computing an evaluating value representing the entire image sensed picture based on the evaluating values supplied from the evaluating value detecting means; exposure control means for controlling the exposure changing means such that an output of the computing means coincides with a predetermined desired value; means for computing a value indicating the contrast of the image sensed picture based on the evaluating values outputted from the evaluating value detecting means; and means for determining any one of the plurality of gamma correction values of the gamma correction means based on the value indicating the contrast of the image sensed picture.

Therefore, a principal advantage of the present invention is that even when an abnormal luminance portion is partially included in a picture, weighting of an exposure evaluating value in a sampling area including the abnormal luminance portion is decreased so that the effect of the abnormal luminance portion on exposure adjustment of the entire picture can be restrained, whereby suitable exposure adjustment can be achieved.

Another advantage of the present invention is that a value of the contrast of a picture is found from an evaluating value based on a video signal and a gamma correction value is further determined by using the value of the contrast, whereby the most suitable gamma correction can be automatically performed with respect to an object.

Still another advantage of the present invention is that an evaluating value based on a video signal obtained from an image sensor is used in common for exposure control and determination of a gamma correction value, so that an auto iris operation and a gamma correction operation can be simultaneously performed in a simple circuit configuration.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a schematic block diagram showing a second embodiment of the present invention;

FIG. 6 is a schematic block diagram showing a third embodiment of the present invention;

DESCRIPTION OF THE PREFERRED EMBODIMENTS

Figure 1:
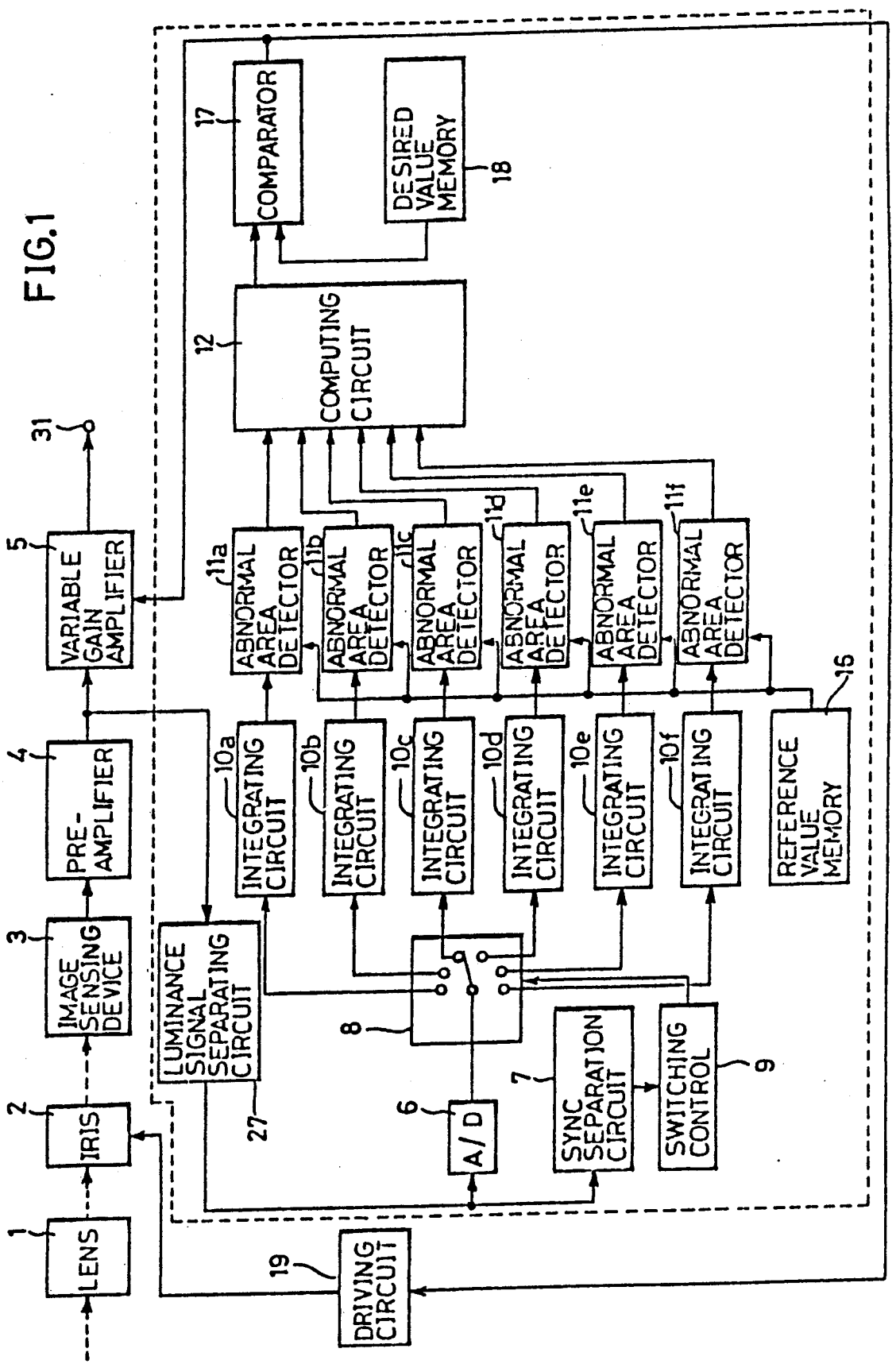
FIG. 1 is a schematic block diagram showing an image sensing apparatus according to a first embodiment of the present invention.

FIG. 1 is a schematic block diagram showing an image sensing apparatus such as a video camera according to a first embodiment of the present invention.

In FIG. 1, incident light on a lens 1 from an object (not shown) is applied to an image sensing device 3 comprising a solid state image sensor such as a CCD (Charge Coupled Device) after the amount thereof is adjusted by an optical iris mechanism 2. The image sensing device 3 converts this incident light into an electrical signal, to output the same as an image sensed video signal.

More specifically, this image sensed video signal is serially extracted from the image sensing device 3 by horizontal scanning and vertical scanning and amplified by a pre-amplifier 4 according to predetermined gain and then, applied to a variable gain amplifier 5 and a luminance signal separating circuit 27.

The luminance signal separating circuit 27 extracts a luminance signal in the image sensed video signal supplied from the pre-amplifier 4 to apply the same to an A-D converter 6 and a synchronous separating circuit 7.

The A-D converter 6 converts a level of luminance signal extracted by the luminance signal separating circuit 27 into a digital value one by one, to apply the digital value to a switching circuit 8. In addition, the synchronous separation circuit 7 separates vertical and horizontal synchronizing signals in the luminance signal applied from the luminance signal separating circuit 27, to apply the same to a switching control circuit 9. This switching control circuit 9 controls switching of the switching circuit 8 in response to both synchronizing signals and a clock signal from a clock signal source (not shown) used for controlling the image sensing device 3.

Figure 2:
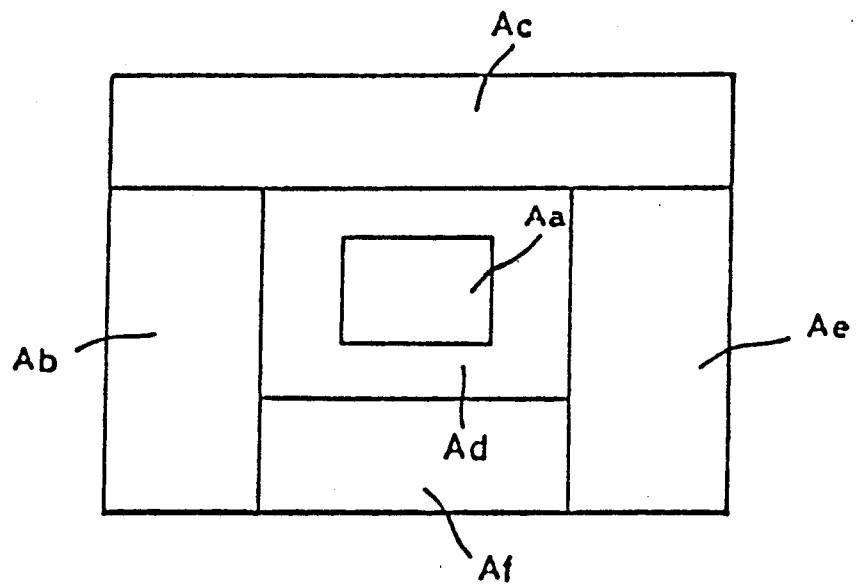
FIG. 2 is a typical diagram showing a manner of setting sampling areas in the embodiment shown in FIG. 1.

More specifically, an entire picture is divided into sampling areas Aa, Ab, ..., Af as shown in FIG. 2 in a time-divisional manner of a video signal corresponding to one field, so that the switching circuit 8 is switched corresponding to each of the sampling areas. More specifically, an A-D converted value of a video signal corresponding to each of the sampling areas is selected in a time-divisional manner by the switching circuit 8, so that the A-D converted values of the video signals in the sampling areas are respectively inputted to corresponding integrating circuits 10a, 10b, ..., 10f, to be integrated. Since each of the integrating circuits is reset in response to the vertical synchronizing signal, the integration is always done with respect to the video signal corresponding to one field. Meanwhile, each of the integrating circuits comprises an adder (not shown) and a latch circuit (not shown) for latching an output of the adder. The adder adds a digital value of the applied video signal to an output of the latch circuit in the succeeding stage.

As a result, the luminance signal levels of the video signals for each one field corresponding to the sampling areas Aa, Ab, ..., Af are respectively held in the integrating circuits 10a, 10b, ..., 10f as digital values. The digital value thus held in each of the integrating circuits is referred to as an exposure evaluating value for each sampling area hereinafter.

Then, the results of the integration by the integrating circuits 10a, 10b, ..., 10f are respectively inputted to corresponding abnormal area detecting circuits 11a, 11b, ..., 11f. Each of the abnormal area detecting circuits 11a, 11b, ..., 11f determines whether or not there exists an abnormal luminance portion such as a high luminance portion such as a light source and a low luminance portion such as deep green in the corresponding sampling area based on a reference value P stored in a 5 reference value memory. If such an abnormal luminance portion exists, the abnormal area detecting circuit prevents an exposure evaluating value in the corresponding sampling are from being inputted to a computing circuit 12 in the succeeding stage.

Figure 3:
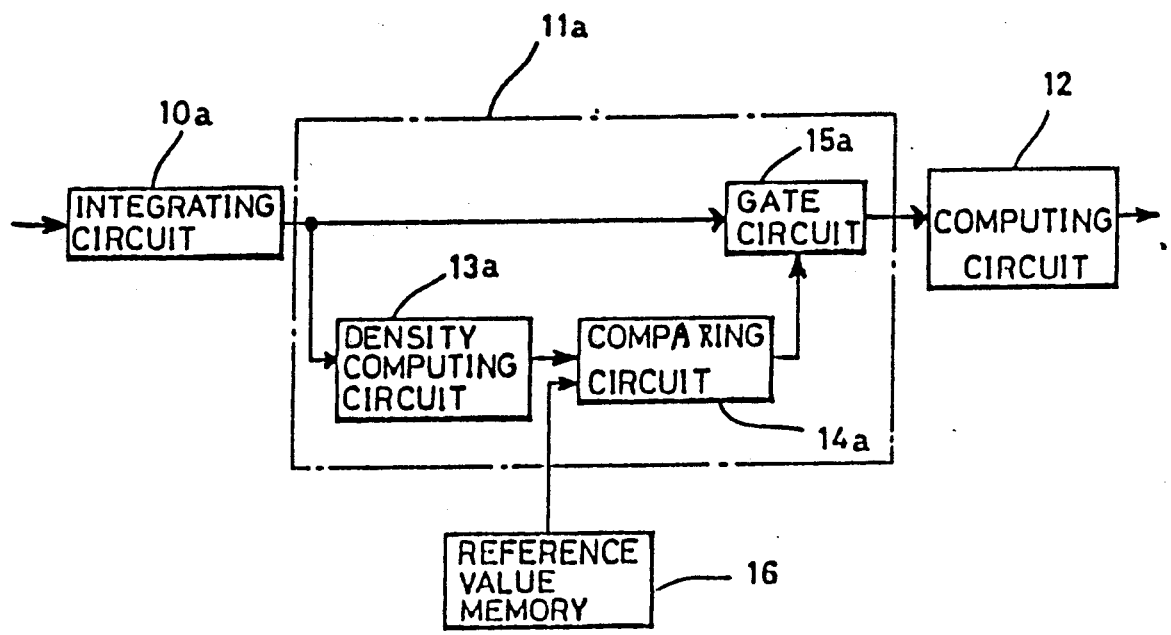
FIG. 3 is a block diagram showing a specific structure of an abnormal area detecting circuit shown in FIG. 1.

FIG. 3 is a block diagram showing a specific = structure of such an abnormal area detecting circuit 11a, the other abnormal area detecting circuits 11b, 11c, ..., 11f respectively having the same structure as that of the circuit 11a. In FIG. 3, the abnormal area detecting circuit 11a comprises a density computing circuit 13a, a comparing circuit 14a, and a gate circuit 15a. An exposure evaluating value La from the integrating circuit 10a is applied to the density computing circuit 13a. This density computing circuit 13a computes a density $Da = 0\, La/Sa$ based on an area Sa of the corresponding sampling area Aa, to apply the same to the comparing circuit 14a. Areas of the sampling areas are previously set, respectively, which are not necessarily the same. The comparing circuit 14a compares this density Da with the reference value P previously stored in the reference value memory 16, to generate a signal for bringing the gate circuit 15a in the succeeding stage to an opened state if the difference therebetween is in an allowable range while generating a signal for bringing the gate circuit 15a to a closed state if it exceeds the allowable range. More specifically, if and when the density Da is extremely larger or smaller than the reference value P and the difference therebetween exceeds the allowable range, this means that there exists an abnormal luminance portion such as a high luminance portion such as a light source and a low luminance portion such as deep green in the sampling area, so that the passage of the exposure evaluating value from the integrating circuit 10a is prevented by the gate circuit 15a.

The computing circuit 12 adds all exposure evaluating values in sampling areas which passed through the gate circuits in the respective abnormal area detecting circuits, and computes an evaluating value per unit area, i.e., a value corresponding to the average density of all the areas. For example, considering a case in which the abnormal luminance portion such as a light source exists only in the sampling area Ac, the passage of only an exposure evaluating value Lc is prevented by the abnormal area detecting circuit 11c. As a result, exposure evaluating values La, Lb, Ld, Le and Lf are inputted to the computing circuit 12. The computing circuit 12 divides Lx which is the sum of the exposure evaluating values by the sum Sx of the areas of the sampling areas Aa, Ab, Ad, Ae and Af which are not determined to be abnormal by each of the abnormal area detecting circuits, to output the result of the division as a computed value $N_1$. That is:

$$N1 = \frac{Lx}{Sx} = \frac{La + Lb + Ld + Le + Lf}{Sa + Sb + Sd + Se + Sf}$$

This average density $N_1$ is inputted to a comparator 17, to be compared with a desired value Q previously stored in a desired value memory 18. The comparator 17 generates an error signal corresponding to the difference therebetween, to apply the same to the variable gain amplifier 5 and a driving circuit 19.

The driving circuit 19 generates a signal for driving a driving mechanism such as an iris motor (not shown) in the iris mechanism 2 in response to this error signal, to adjust the size of the aperture of the diaphragm of the iris mechanism 2 such that the computed value $N_1$ outputted from the computing circuit 12 coincides with the desired value Q. In addition, the gain of the variable gain amplifier 5 is adjusted in response to the above described error signal such that the computed value $N_1$ coincides with the desired value Q. An output of the variable gain amplifier 5 is outputted through an output terminal 31 as a video output signal. This desired value Q is a value previously set so as to achieve most suitable exposure condition.

As described in the foregoing, in the above described first embodiment, even if an abnormal luminance portion exists in a part of a picture, the effect of the abnormal luminance portion on an exposure evaluating value can be eliminated, so that a suitable auto iris operation can be performed.

Figure 5:
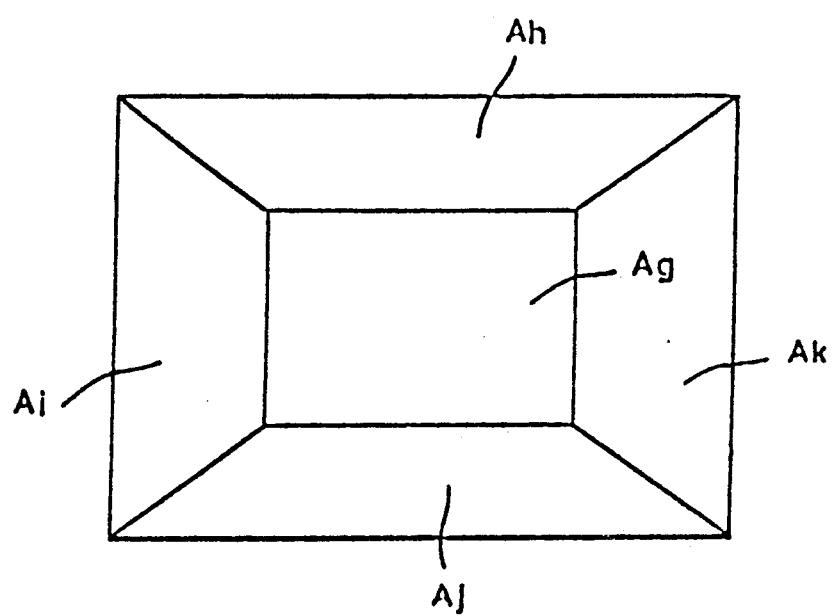
FIG. 5 is a typical diagram showing a manner of setting sampling areas in the embodiment shown in FIG. 4.

FIG. 4 is a schematic block diagram showing a second embodiment of the present invention, showing a portion corresponding to a portion encircled by a broken line in the image sensing apparatus shown in FIG. 1. More specifically, in FIG. 4, illustration of a lens 1, an iris mechanism 2, an image sensing device 3, a pre-amplifier 4, a variable gain amplifier 5, a driving circuit 19 and a luminance signal separating circuit 27 is omitted for simplification. In addition, sampling areas are set in such a manner that an entire picture is divided into one central area Ag and four peripheral areas Ah, Ai, Aj and Ak as shown in FIG. 5, unlike FIG. 2.

In the circuit shown in FIG. 4, A-D converted values of video signals corresponding to sampling areas are selected by a switching circuit 20 in a time-divisional manner and respectively inputted to corresponding integrating circuits 10g, 10h, ..., 10k, to be integrated. The integrating circuits have the same structure as those shown in FIG. 1. Exposure evaluating values Lg, Lh, ..., Lk in sampling areas Ag, Ah, ..., Ak are respectively outputted from the integrating circuits 10g, 10h, ..., 10k.

The exposure evaluating value Lg in the central sampling area Ag is applied to a density computing circuit 22 from the integrating circuit 10g. This density computing circuit 22 divides the exposure evaluating value Lg by an area of the sampling area Ag, to compute a density Dg. This density Dg is applied to one input of a comparator 23, as well as to a fixed contact 21b of a switching circuit 21. The comparator 23 compares the density Dg with a reference value P of a reference value memory 16, to generate a signal for controlling switching of the switching circuit 21. More specifically, if the density Dg is in an allowable range with respect to the reference value P, it is determined that an abnormal luminance portion does not exist in the area Ag, so that a variable contact 21a of the switching circuit 21 is connected to the fixed contact 21b. As a result, the density Dg is inputted to a comparator 17 from the density computing circuit 22, to be compared with a desired value Q stored in a desired value memory 18. The result of the comparison is applied to the variable gain amplifier 5 and the driving circuit 19, which are not shown, as an error signal, so that an auto iris operation is performed in the same manner as that shown in FIG. 1.

On the other hand, if the density Dg is extremely larger or smaller than the reference value P, the variable contact 21a of the switching circuit 21 is switched to a fixed contact 21c in response to the output of the comparator 23, so that an output of a computing circuit 62 is inputted to the comparator 17.

The exposure evaluating values Lh, Li, Lj and Lk corresponding to the peripheral sampling areas Ah, Ai, Aj and Ak from the integrating circuits 10h, 10i, 10j and 10k are respectively applied to abnormal area detecting circuits 11h, 11i, 11j and 11k. The abnormal area detecting circuits respectively have the same structure as the abnormal area detecting circuit shown in FIG. 3. Each of the abnormal area detecting circuits 11h, 11i, 11j and 11k determines based on the reference value P stored in the reference value memory 16 whether or not an abnormal luminance portion exists in the corresponding sampling area, to prevent the passage of the exposure evaluating value if such an abnormal luminance portion exists.

The computing circuit 62 computes a value $N_2$ corresponding to the average density in response to the remaining exposure evaluating values but excluding the exposure evaluating value the passage of which is prevented by the above described abnormal area detecting circuit out of the exposure evaluating values Lh, Li, Lj and Lk from the integrating circuits 10h, 10i, 10j and 10k, similarly to the computing circuit 12 in the first embodiment. This computed value $N_2$ is compared with a desired value Q in the comparator 17, so that the result of the comparison is used as an error signal in an auto iris operation.

As described in the foregoing, according to the above described second embodiment, it is first determined whether or not an abnormal luminance portion exists in only the central sampling area Ag. If the abnormal luminance portion does not exist, an auto iris operation is performed based on only the density Dg of the exposure evaluating value Lg in this area Ag. The auto iris operation is performed based on the value $N_2$ corresponding to the average density of all the areas where the abnormal luminance portion does not exist in the peripheral areas only after it is determined that the abnormal luminance portion exists. More specifically, in many cases, a major object is generally arranged in the central area Ag in a picture. Thus, according to the second embodiment, the central area Ag is given priority so that an auto iris operation can be performed with higher precision.

FIG. 6 is a schematic block diagram showing a third embodiment of the present invention, showing a portion corresponding to a portion encircled by a broken line in the image sensing apparatus shown in FIG. 1. In the third embodiment, a manner of setting sampling areas is the same as that in the second embodiment shown in FIG. 5.

The third embodiment shown in FIG. 6 is the same as the second embodiment shown in FIG. 4 except for the following. More specifically, an output of an integrating circuit 10g is connected to a movable contact 24a of a switching circuit 24. A fixed contact 24b of a switching circuit 24 is directly connected to a fixed contact 25b of a switching circuit 25, while a fixed contact 24c of the switching circuit 24 is connected to a fixed contact 25c of the switching circuit 25 through a weighting circuit 26. This weighting circuit 26 is a multiplier for, for example, multiplying an inputted digital value by two to output the same. A movable contact 25a of the switching circuit 25, together with exposure evaluating values Lh, Li, Lj and Lk in the remaining sampling areas outputted from the remaining integrating circuits 10h, 10i, 10j and 10k, is applied to a computing circuit 42. In addition, switching of the switching circuits 24 and 25 is controlled in response to an output of a comparator 23.

More specifically, if and when a density Dg of an exposure evaluating value Lg in a central sampling area Ag is in an allowable range with respect to a reference value P stored in a reference value memory 16, the movable contacts 24a and 25b are respectively connected to the fixed contacts 24c and 25c in response to the output of the comparator 23. Therefore, the exposure evaluating value Lg in the central sampling area Ag is weighted by two times by the weighting circuit 26 and then, inputted to the computing circuit 42. This computing circuit 42 computes a value $N_3$ corresponding to the average density of all the areas based on exposure evaluating values in every received area, similarly to the computing circuit 12 shown in FIG. 1. This value $N_3$ is compared with a desired value Q in a comparator 17, so that the result of this comparison is used as an error signal in an auto iris operation. More specifically, if an abnormal luminance portion does not exist in the central area Ag, an auto iris operation is performed, thinking the exposure evaluating value in this central area where a major object is generally arranged more important than those in the peripheral areas.

On the other hand, if and when the density Dg of the exposure evaluating value Lg in the central area Ag is outside an allowable range with respect to the reference value P, the movable contacts 24a and 25a are respectively connected to the fixed contacts 24b and 25b in response to an output of the comparator 23. Consequently, the focus evaluating value Lg in the central area Ag is directly inputted to the computing circuit 42 without passing through the weighting circuit 26. The computing circuit 42 computes the computed value $N_3$ corresponding to the average density based on exposure evaluating values in the respective received areas. This computed value $N_3$ is compared with the desired value Q in the comparator 17, so that the result of this comparison is used as an error signal in an auto iris operation. More specifically, if an abnormal luminance portion exists in the central area, weighting of the exposure evaluating value Lg in this area Ag is released, so that the effect of this exposure evaluating value Lg on the auto iris operation is decreased.

As described in the foregoing, the central area Ag is thought more important than the peripheral area so that an auto iris operation can be performed with high precision.

Figure 7:
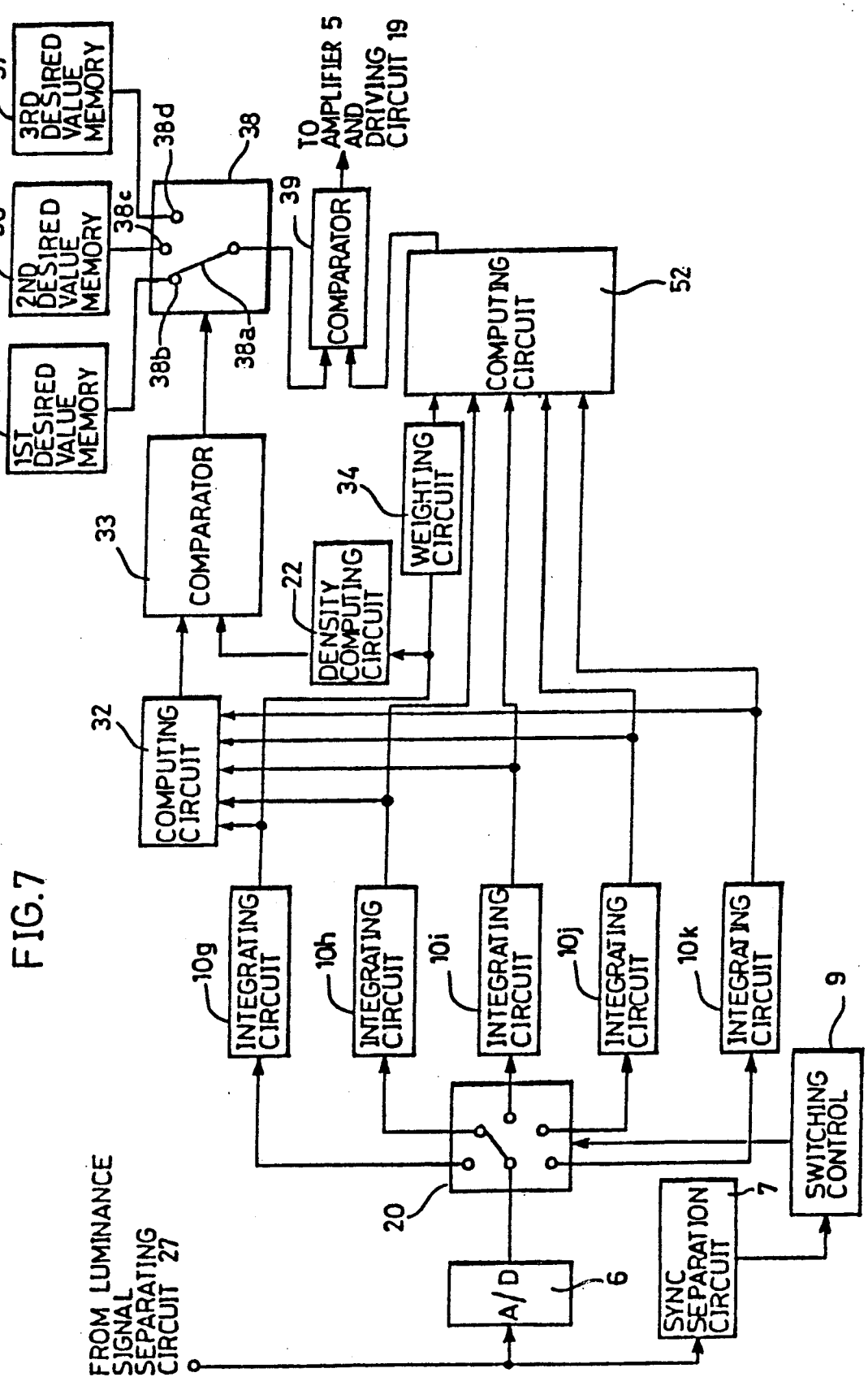
FIG. 7 is a schematic block diagram showing a fourth embodiment of the present invention.

FIG. 7 is a schematic block diagram showing a fourth embodiment of the present invention, showing a portion corresponding to the portion encircled by the broken line in the image sensing apparatus shown in FIG. 1 as in Figs. 4 and 6. In the fourth embodiment, a manner of setting sampling areas is the same as that shown in FIG. 5.

The fourth embodiment shown in FIG. 7 is similar to the third embodiment shown in FIG. 6 except for the following. More specifically, exposure evaluating values in sampling areas held in integrating circuits 10g, 10h, 10j, 10i and 10k are all inputted to a computing circuit 32, so that a value (average density) $M_1$ of an exposure evaluating value per unit area in all the sampling areas is computed. This computed value $M_1$ is applied to one input of a comparator 33 as a reference value, to be compared with a density Dg of a central area Ag from a density computing circuit 22. Switching of a switching circuit 38 is controlled according to the result of this comparison. More specifically, if and when the density Dg is in an allowable range with respect to the computed value $M_1$, a movable contact 38a of the switching circuit 38 is selectively connected to a fixed contact 38b, so that a first desired value $R_1$ previously stored in a first desired value memory 35 is applied to one input of a comparator 39 as a desired value. In addition, if the density Dg is below the allowable range with respect to the computed value $M_1$, the movable contact 38a is selectively connected to a fixed contact 38c, so that a second desired value $R_2$ previously stored in a second desired value memory 36 is applied to one input of the comparator 39 as a desired value. Furthermore, when the density Dg is above the allowable range with respect to the computed value $M_1$, the movable contact 38a is - selectively connected to a fixed contact 38d, so that a third desired value $R_3$ previously stored in a third desired value memory 37 is applied to one input of the comparator 39 as a desired value. Meanwhile, the relation $R_2 < R_1 < R_3$ holds between the first to third desired values $R_1$, $R_2$ and $R_3$.

Additionally, only an exposure evaluating value Lg in a central area Ag out of the exposure evaluating values in the areas is weighted by two times by a weighting circuit 34. This weighted exposure evaluating value Lg, together with exposure evaluating values Lh, Li, Lj and Lk in the other areas, is applied to a computing circuit 52. The computing circuit 52 computes a value (average density) $M_2$ of an exposure evaluating value per unit area in all the sampling areas, to apply the same to the other input of the comparator 39. The comparator 39 compares this computed value $M_2$ with any one of the above described first to third desired values, the result of this comparison being used for an auto iris operation as an error signal.

Thus, according to the fourth embodiment, the reference value P and the desired value Q which are fixed in the above described first to third embodiments are changed according to the situations.

More specifically, if and when an abnormal luminance portion does not exist on a picture, the comparator 33 determines that the density Dg is in the allowable range - with respect to the computed value $M_1$. Consequently, the first desired value $R_1$ is selected by the switching circuit 38, to be applied to one input of the comparator 39. On this occasion, the computing circuit 52 computes the computed value $M_2$ with only the exposure evaluating value Lg in the central sampling area Ag being weighted by two times, to apply the same to the other input of the comparator 39. The comparator 39 compares both the inputs, to generate an error signal for an auto iris operation. In this state, if the amount of light in the entire picture is increased, both the inputs of the comparator 33 are increased almost equally, so that the switching circuit 38 continues to select the first desired value $R_1$ while the computed value $M_2$ is increased, so that the difference between the first desired value $R_1$ and the computed value $M_2$, i.e., an error signal is increased. Therefore, the size of the aperture is decreased, so that the amount of incident light is restrained.

Then, if and when an extremely low luminance portion such as deep green exists only in the central sampling area Ag, the density Dg of the central area Ag is significantly decreased, as compared with the computed value $M_1$. As a result, when the comparator 33 determines that the density Dg is below the allowable range, the second desired value $R_2$ is selected by the switching circuit 38, to be inputted to one input of the comparator 39. On the other hand, the computed value $M_2$ applied to the other input of the comparator 39 is decreased. However, since the second desired value $R_2$ is set smaller than the first desired value $R_1$, the error signal which is the result of comparison by the comparator 39 is not significantly increased.

Additionally, if and when an extremely high luminance portion such as the sun exists only in the central sampling area Ag, the density Dg of the central area Ag is significantly increased, as compared with the computed value $M_1$. As a result, when the comparator 33 determines that the density Dg is above the allowable range, the third desired value $R_3$ is selected by the switching circuit 38, to be applied to one input of the comparator 39. On the other hand, the computed value $M_2$ applied to the other input of the comparator 39 is increased. However, since the third desired value $R_3$ is set larger than the first desired value $R_1$, the error signal which is the result of comparison by the comparator 39 is not significantly increased.

Thus, according to the fourth embodiment of the present invention, even if an abnormal luminance portion exists only in the central sampling area Ag, a desired value is responsively selected. Thus, the error signal itself is not greatly changed, so that the effect of the abnormal luminance portion on the auto iris operation is restrained.

The above described embodiments will be compared with each other in the following. In the first embodiment shown in FIG. 1, exposure evaluating values in an area where an abnormal luminance portion exists and an area where it does not exist are weighted in the ratio 0:1, that is, the area where the abnormal luminance portion exists is completely ignored in making computation of the overall density. On the other hand, in the second embodiment shown in FIG. 4, an auto iris operation is performed by always giving priority to an exposure evaluating value in a central area so long as an abnormal luminance portion does not exist. In addition, in the third embodiment shown in FIG. 6, an exposure evaluating value in a central area is weighted as compared with peripheral areas depending on whether an abnormal luminance portion exists in the central area. Furthermore, in the fourth embodiment shown in FIG. 7, a desired value is changed depending on whether an abnormal luminance portion exists in a central area, so that an error signal is prevented from being unnecessarily changed.

Figure 8:
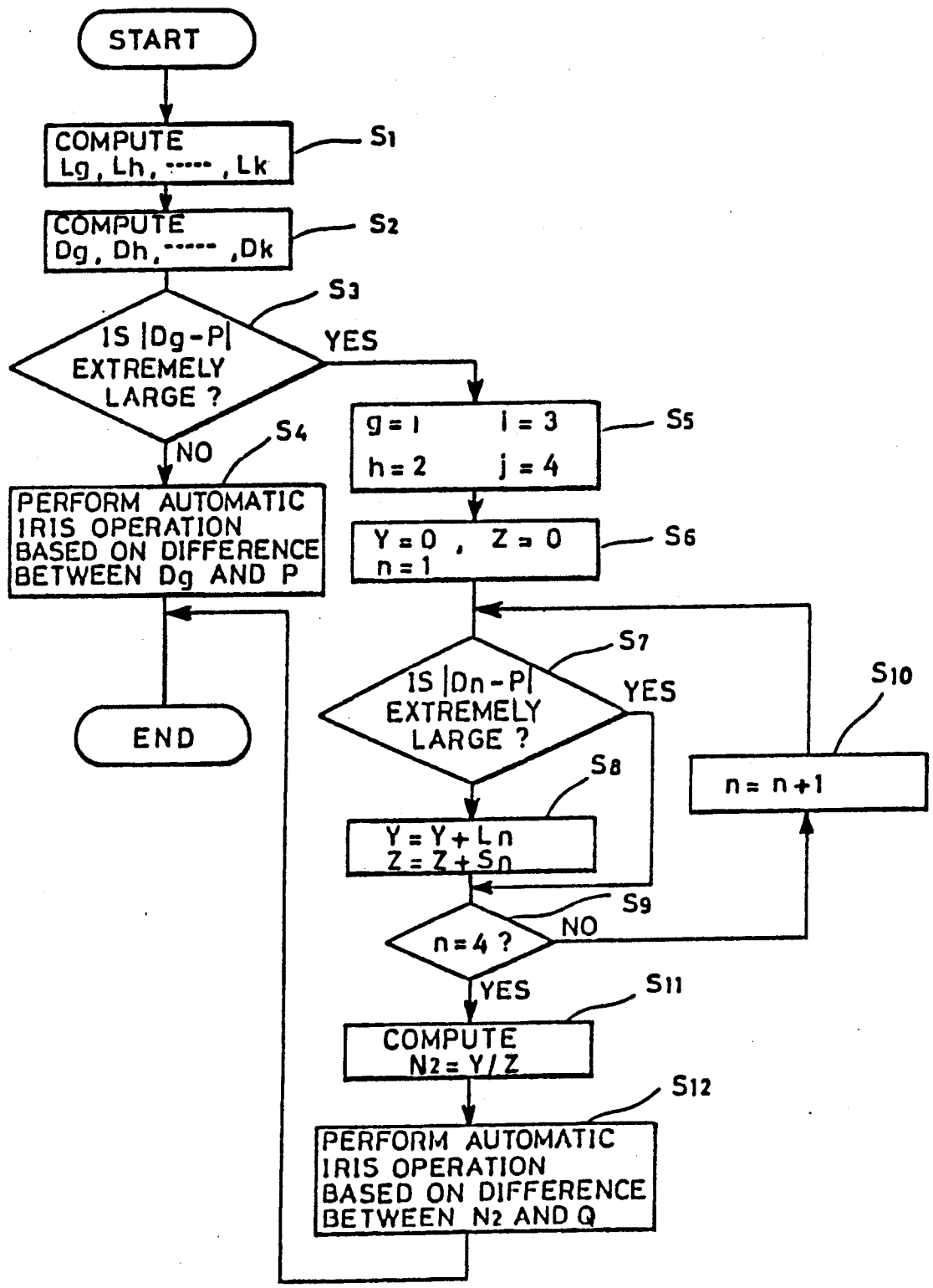
FIG. 8 is a flowchart showing processing performed when the embodiment shown in FIG. 4 is performed in a software manner.

Additionally, an operation in each of the above described embodiments can be processed in a software manner using a microcomputer. FIG. 8 is a flowchart showing processing performed when the second embodiment shown in FIG. 4 is performed in a software manner, for example.

In FIG. 8, exposure evaluating values Lg, Lh, ..., Lk in respective sampling areas are first computed (in the step S1). Then, the exposure evaluating values are respectively divided by areas of the corresponding sampling areas, to compute densities Dg, Dh, ..., Dk of the respective areas (in the step S2). The density Dg of a central sampling area Ag is compared with a predetermined reference value P (in the step S3). If the absolute value of the difference therebetween is in a allowable range, the difference between the density Dg and a predetermined desired value Q is computed, so that an auto iris operation is performed based on this difference (in the step S4).

On the other hand, if and when the density Dg is extremely large or small and the absolute value of the difference between the density Dg and the reference value P exceeds the allowable range, it is sequentially determined whether or not an abnormal luminance portion exists with respect to peripheral areas Ag, Ah, Aj and Ak. More specifically, subscripts g, h, i and j representing the areas are respectively replaced with n=1, 2, 3 and 4 for convenience (in the step S5). An integrated value Y of an exposure evaluating value in each area and an integrated value Z of each area are initialized (in the step S6). First, the density $D_1$ of the area $A_1$ is compared with a predetermined reference value P (in the step S7). If the absolute value of the difference therebetween is in the allowable range, the exposure evaluating value $L_1$ in the area $A_1$ is added to an initial value Y=0, and the area $S_1$ of the area $A_1$ is added to an initial value Z=0. This operation is repeated until n=4 (in the steps S9 and S10). When it is determined that the absolute value of the difference between the density Dn and the reference value P exceeds the allowable range (in the step S7), the exposure evaluating value Ln and the are Sn of the area at that time are not respectively added to Y and Z.

Then, when addition of exposure evaluating values and addition of areas of the sampling areas are terminated (i.e. when n=4), the final sum of the exposure evaluating values is divided by the final sum of the areas of the sampling areas in the step S11, so that a value $N_2$ of the average density is computed. The difference between this computed value $N_2$ and a desired value Q is computed, so that an auto iris operation is performed based on this difference (in the step S12).

Thus, in the processing shown in FIG. 8, it is determined whether or not an abnormal luminance portion exists only in the central sampling area. If the abnormal luminance portion does not exist, the auto iris operation is performed based on only the density of the exposure evaluating value in this area. The auto iris operation is performed based on the value $N_2$ of the average density of those peripheral areas where an abnormal luminance portion does not exist only after it is determined that abnormal luminance exists in the central sampling area.

Although in the above described embodiments, an exposure evaluating value per unit area of a sampling area, i.e., the density, is used for comparison using a reference value or a desired value, the product of an area of the sampling area and a predetermined value may be used as the reference value and the desired value for direct comparison with an exposure evaluating value in each area.

As described in the foregoing, according to the first to fourth embodiments of the present invention, when an abnormal luminance portion is partially included in picture, the effect of the abnormal luminance portion on exposure adjustment of the entire picture can be restrained, so that a video signal subjected to suitable exposure adjustment can be obtained.

Figure 9:
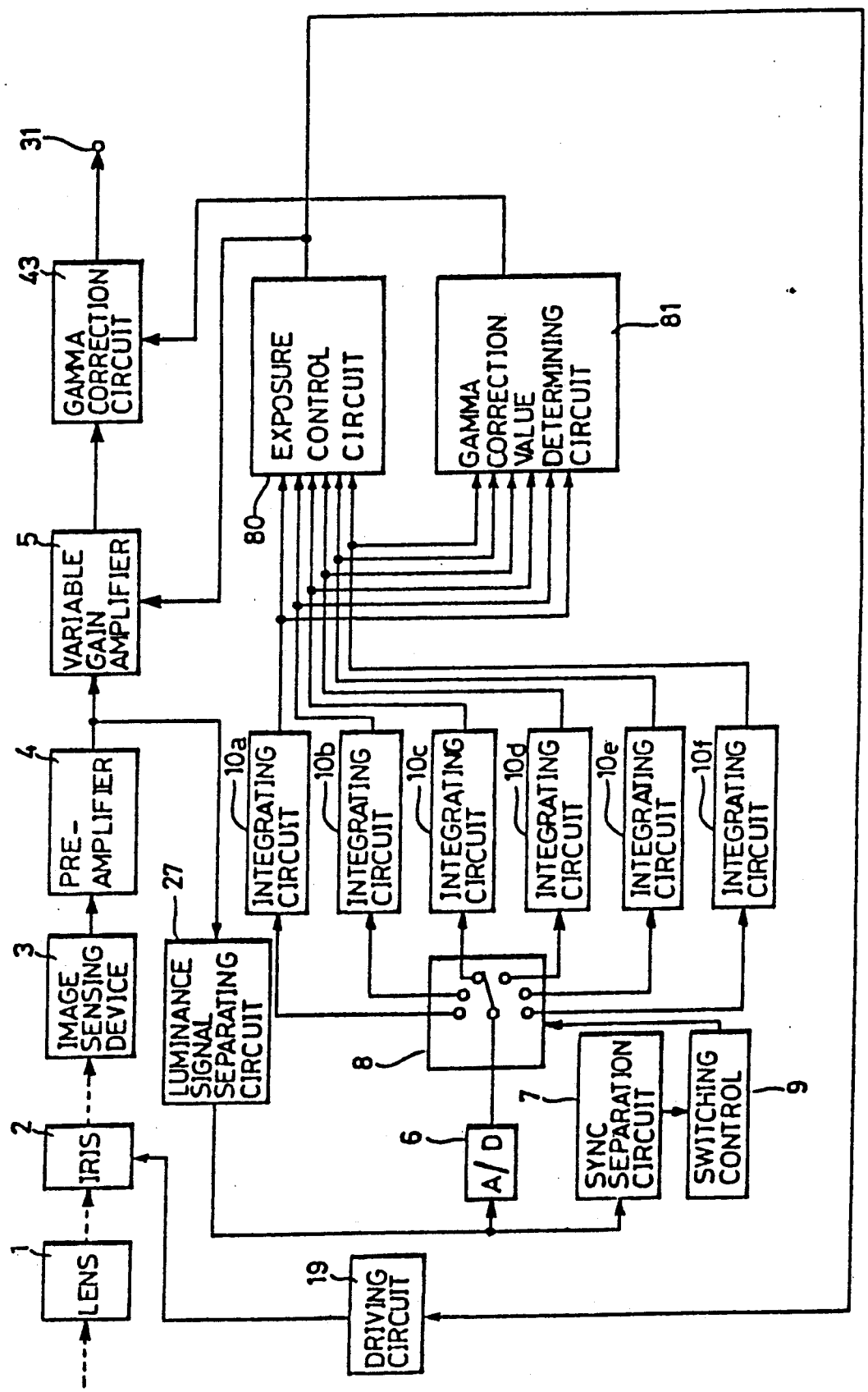
FIG. 9 is a schematic block diagram showing a fifth embodiment of the present invention.

FIG. 9 is a schematic block diagram showing an image sensing apparatus according to a fifth embodiment of the present invention. In the fifth embodiment, a manner for setting sampling areas is the same as that in the first embodiment shown in FIG. 2. The image sensing apparatus shown in FIG. 9 is the same as that shown in FIG. 1 except for the following. More specifically, exposure evaluating values La, Lb, ..., Lf computed in respective integrating circuits 10a, 10b, ..., 10f are applied to an exposure control circuit 80, as well as to a gamma correction value determining circuit 81.

Figure 10:
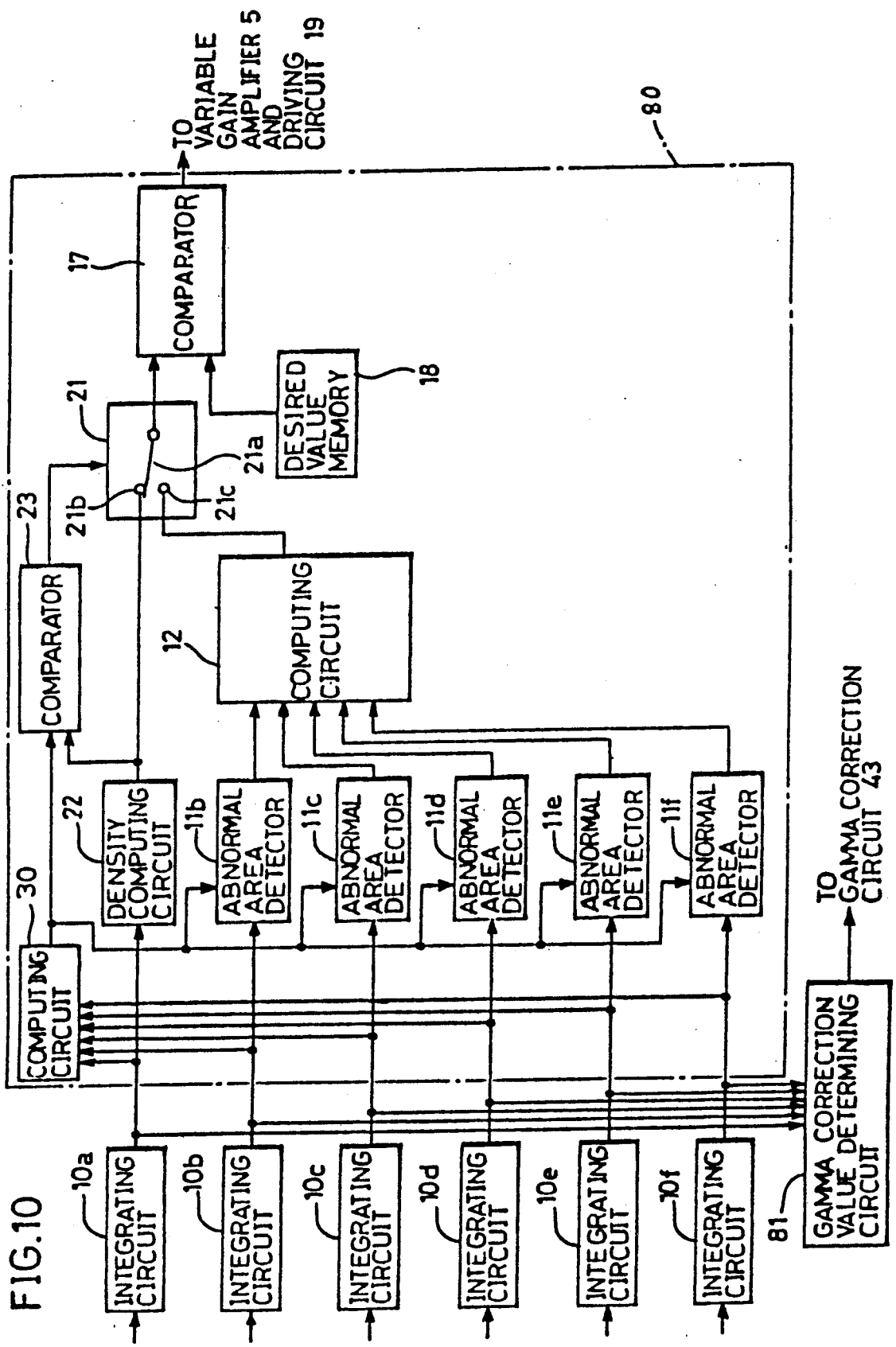
FIG. 10 is a schematic block diagram showing one example of an exposure control circuit 80 shown in FIG. 9.

FIG. 10 is a schematic block diagram showing one example of the exposure control circuit 80 shown in FIG. 9. In FIG. 10, exposure evaluating values in sampling areas held in the integrating circuits 10a, 10b, ..., 10f are all inputted to a computing circuit 30. This computing circuit 30 computes an exposure evaluating value per unit area in all sampling areas, to output the same as a reference value P, similarly to a computing circuit 32 shown in FIG. 7. This reference value P is inputted to a comparator 23, to be compared with a density Da of a central area Aa from a density computing circuit 22. Switching of a switching circuit 21 is controlled according to the result of this comparison.

More specifically, if and when the density Da is in an allowable range with respect to a reference value P, it is determined that an abnormal luminance portion does not exist in the central area Aa, so that a movable contact 21a of the switching circuit 21 is connected to a fixed contact 21b. As a result, the density Da is inputted from the density computing circuit 22 to a comparator 17, to be compared with a desired value Q stored in a desired value memory 18. The result of the comparison is used as an error signal in an auto iris operation. On the other hand, when the density Da exceeds the allowable range with 20 respect to the reference value P, the movable contact 21a of the switching circuit 21 is switched to a fixed contact 21c in response to an output of the comparator 23, so that an output of a computing circuit 12 is inputted to the comparator 17.

Exposure evaluating values Lb, Lc, Ld, Le and Lf from the respective integrating circuits 10b, 10c, 10d, 10e and 10f are respectively applied to abnormal area detecting circuits 11b, 11c, 11d, 11e and 11f. The abnormal area detecting circuits are respectively the same as those shown in FIG. 3. Each of the abnormal area detecting circuits 11b, 11c, 11d, 11e and 11f determines based on the reference value P from the computing circuit 30 whether or not an abnormal luminance portion exists in the corresponding sampling area, to prevent the passage of the exposure evaluating value if such an abnormal luminance portion exists.

The computing circuit 12 computes an exposure evaluating value (average density) per unit area as in the above described first embodiment, upon receipt of the exposure evaluating values Lb, Lc, Ld, Le and Lf from the integrating circuits 10b, 10c, 10d, 10e and 10f excluding the exposure evaluating value the passage of which is prevented by the abnormal area determining circuit. This computed value N is compared with a desired value Q in the comparator 17, the result of the comparison being used as one error signal in an auto iris operation.

As described in the foregoing, in the exposure control circuit shown in FIG. 10 it is first determined whether or not an abnormal luminance portion exists in only the central sampling are Aa. The auto iris operation is performed based on the average density N of all areas having no abnormal luminance portion out of peripheral areas only when it is determined that the abnormal luminance exists in the central sampling area Aa.

Figure 11:
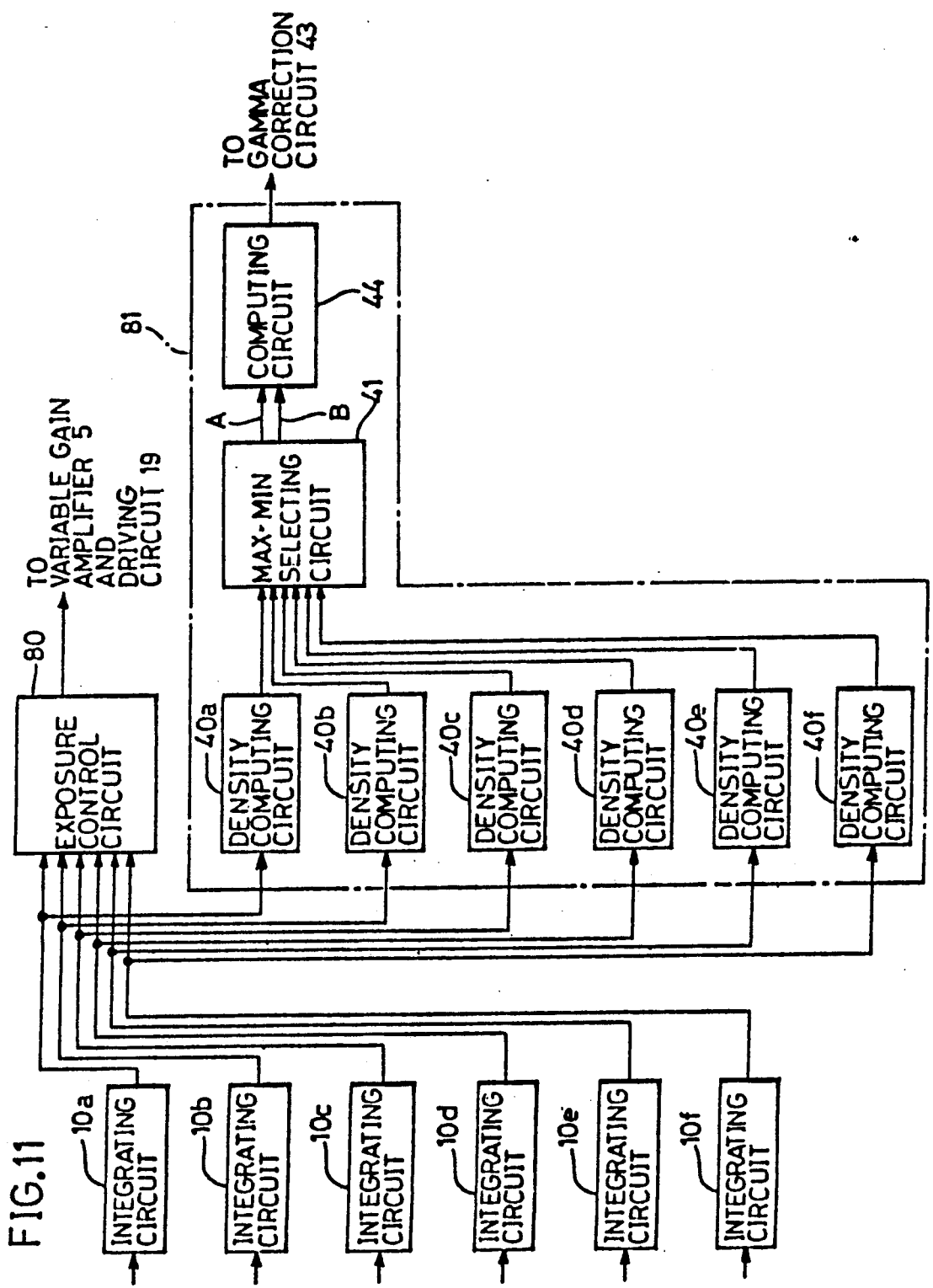
FIG. 11 is a schematic block diagram showing one example of a gamma correction value determining circuit 81 shown in FIG. 9.

FIG. 11 is a schematic block diagram showing one example of the gamma correction value determining circuit 81 shown in FIG. 9.

In FIG. 11, exposure evaluating values La, Lb, ..., Lf from the respective integrating circuits 10a, 10b, ... 10f are respectively inputted to density computing circuits 40a, 40b, ..., 40f, so that respective densities Da, Db, ..., Df of the sampling areas are computed. The computed densities Da, Db, ..., Df are inputted to a maximum value and a minimum value selecting circuit 41, so that the maximum value A and the minimum value B are selected from the densities, to be applied to a computing circuit 44.

This computing circuit 44 is used for changing a gamma correction value to the optimum value based on the ratio of the maximum value A of values of the above described densities to the minimum value B thereof, i.e., the contrast of a picture.

A gamma correction value $\gamma$ is experimentally expressed in the following:

$$\gamma = aLOG(A/B) + b \quad (1)$$

where a and b are constants and $a < 0$ and $b > 0$

Figure 12:
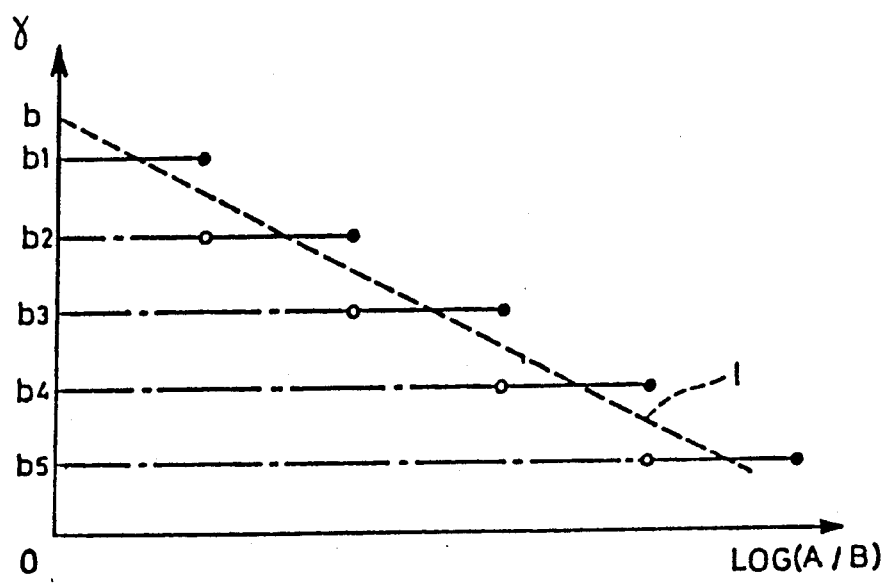
FIG. 12 is a graph showing the relation between a gamma correction value $\gamma$ and LOG (A/B)

FIG. 12 is a graph showing the relation between the gamma correction value $\gamma$ and LOG(A/B). In FIG. 12, a straight line 1 represented by a broken line corresponds to the above described equation (1). In a computing circuit 44 shown in FIG. 11, in order to simplify control, $\gamma$ is approximated based on the straight line 1 (a value represented by a hollow circle is given priority over a value represented by a solid circle), and $\gamma$ is set as its value gradually changes, i.e., $b_1, b_2, b_3, \ldots$, depending on the change in LOG(A/B). In FIG. 12, if the picture contrast A/B is large, LOG(A/B) becomes large. Correspondingly, $\gamma$ becomes small. On the other hand, if the picture contrast A/B is small, LOG(A/B) becomes small. Correspondingly, $\gamma$ becomes large.

Thus, from the relation between LOG(A/B) and $\gamma$ set as shown in FIG. 12, the gamma correction value $\gamma$ is immediately determined from the picture contrast A/B.

As described in the foregoing, a control signal corresponding to the gamma correction value $\gamma$ determined by the computing circuit 44 is inputted to a gamma correction circuit 43, as shown in FIG. 9. The gamma correction circuit 43 changes the amplification factor corresponding to the change in level of an image carried by a video signal based on the gamma correction value $\gamma$ determined by the computing circuit 44, so that the most suitable gamma correction can be performed. Thus, suitable brightness can be obtained over the entire picture even if an object having a high contrast is included in the picture.

A video signal subjected to gamma correction by this gamma correction circuit 43 is outputted through an output terminal 31, to be applied to, for example, a CRT or a VCR (Video Cassette Recorder), which are not shown.

Although in the above described embodiment, the gamma correction value $\gamma$ is determined using the maximum value A and the minimum value B of the densities in respective areas, the gamma correction value $\gamma$ may be determined using dispersion $\delta$ of the densities of respective areas from the following equation:

$$\gamma = a'\delta + b' \quad (2)$$

Furthermore, the gamma correction value $\gamma$ may be determined using dispersion $\delta_L$ of the logarithm LOG(Dn) (where n=1 to 6) of the densities of respective areas from the following equation:

$$\gamma = a''\delta_L + b'' \quad (3)$$

Figure 13:
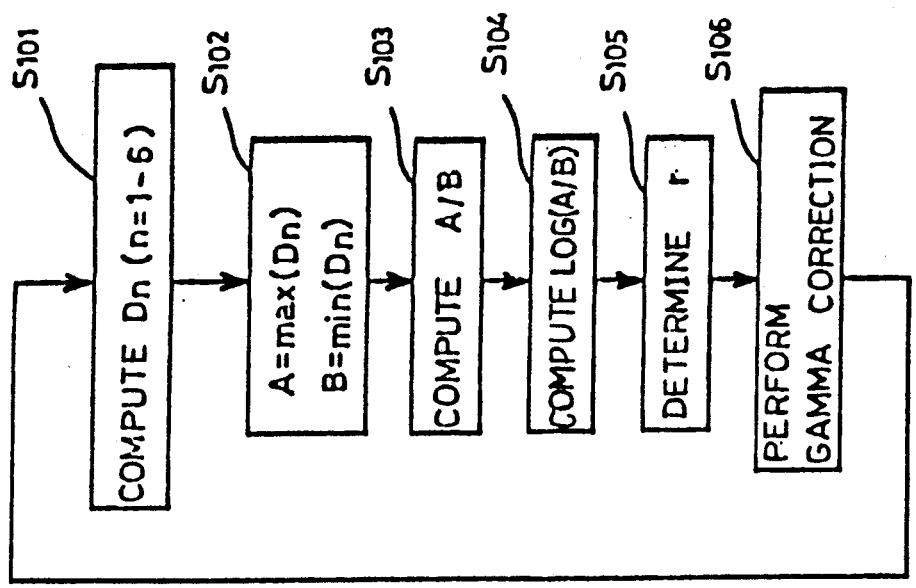
FIG. 13 is a flowchart showing processing performed when a gamma correction value determining operation according to the present invention is performed in a software manner.

Additionally, an operation of the above described gamma correction value determining circuit 81 may be processed in a software manner using a microcomputer. FIG. 13 is a flowchart showing processing performed when such a gamma correction value determining operation is performed in a software manner.

In FIG. 13, densities Dn (n=1 to 6) of respective sampling areas are first computed (in the step S101). Then, the maximum value A and the minimum value B of the computed densities in respective areas are selected (in the step S102). Then, the picture contrast A/B is computed based on the selected maximum value A and minimum value B (in the step S103), and the logarithm LOG (A/B) thereof is further computed (in the step S104). Then, a gamma correction value $\gamma$ corresponding to a value of the computed LOG(A/B) is determined according to an approximating manner of a gamma correction value $\gamma$ shown in FIG. 12 (in the step S105). Gamma correction of an inputted video signal is most suitably performed using this gamma correction value $\gamma$ (in the step S106). Then, the program is returned to the step S101, where the densities Dn based on newly inputted signals are computed and subsequently, the most suitable gamma correction value $\gamma$ is determined.

Meanwhile, if and when an abnormal luminance portion exists in a sampling area, that is, an extremely high luminance portion such as the sun or an extremely low luminance portion such as deep green exists in the sampling area, as in the auto iris operation shown in FIGS. 1 to 8, the gamma correction value $\gamma$ may be unnecessarily small or large by the effect of the abnormal luminance portion. However, such an abnormal luminance portion need not be sensed at a suitable level. Thus, if the abnormal luminance portion is removed from the evaluation of the picture contrast, the gamma correction value $\gamma$ can be prevented from being affected by the abnormal luminance portion.

Figure 14:
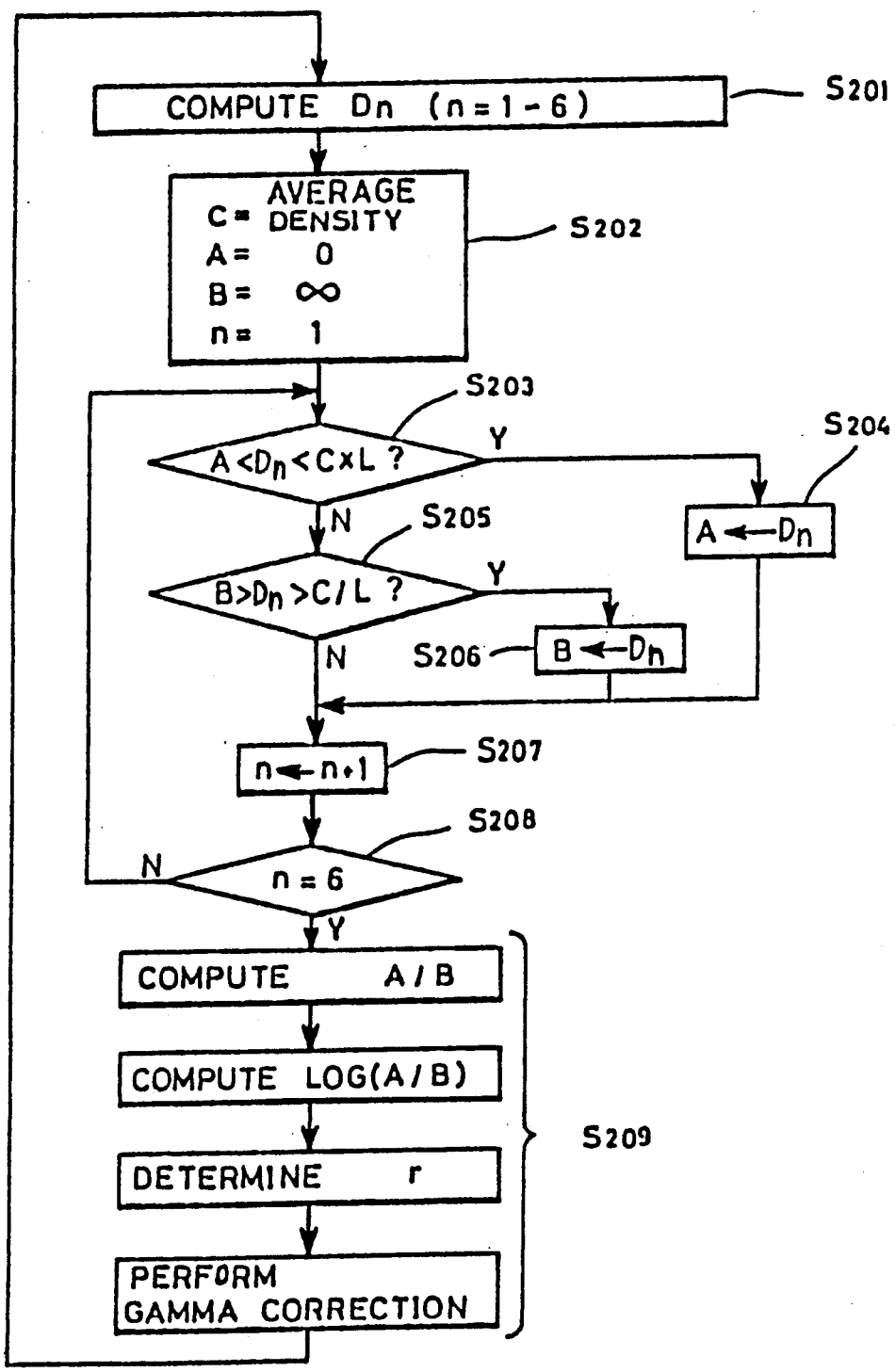
FIG. 14 is a flowchart showing another processing performed when a gamma correction value determining operation according to the present invention is performed in a software manner.

FIG. 14 is a flowchart showing processing in a gamma correction value determining operation performed considering elimination of the effect exerted by such an abnormal luminance portion.

In FIG. 14, densities Dn of respective sampling areas are first computed (in the step S201). Then, the following variables are initialized (in the step S202):
C: a value of the average density of all areas
A: a variable for holding the maximum value
B: a variable for holding the minimum value
n: a counter of the number of areas Then, it is determined whether or not the density Dn of the area is within L times the average density C of all the areas and larger than the maximum value so far (in the step S203). Meanwhile, L is a value previously determined such that an upper limit value and a lower limit value at which a suitable picture is obtained are respectively CXL and C/L. When it is determined in the step S203 that the density Dn of the area is larger than the maximum value so far, the value Dn is taken as the maximum value A (in the step S204).

On the other hand, when it is determined in the step S203 that the density Dn of the area is smaller than the maximum value so far, it is determined in the step S205 whether or not the density Dn of the area is within one-Lth of the average value C and smaller than the minimum value so far. If it is determined in the step S205 that the density Dn of the area is smaller than the minimum value so far, the value Dn is taken as the minimum value B (in the step S206).

The foregoing steps S201 to S206 ar repeated with respect to all sampling areas (in the steps S207 and S208). Thereafter, a gamma correction value γ is determined in the same procedure as that in the steps S103 to S106 in the embodiment shown in FIG. 13, so that gamma correction is performed according to this correction value γ (in the step S209).

The foregoing steps S201 to S209 are repeated every one field.

As described in the foregoing, in the embodiment shown in FIG. 14, a sampling area where an abnormal luminance portion exists is removed from the evaluation of the picture contrast, so that the gamma correction value can be prevented from being unnecessarily small or large by the effect of the abnormal luminance portion.

Although in the fifth embodiment shown in FIG. 9, the circuit shown in FIG. 10 is used as the exposure control circuit 80, any of circuits in the first embodiment shown in FIG. 1, the second embodiment shown in FIG. 4, the third embodiment shown in FIG. 6 and the fourth embodiment shown in FIG. 7 can be applied.

Figure 15:
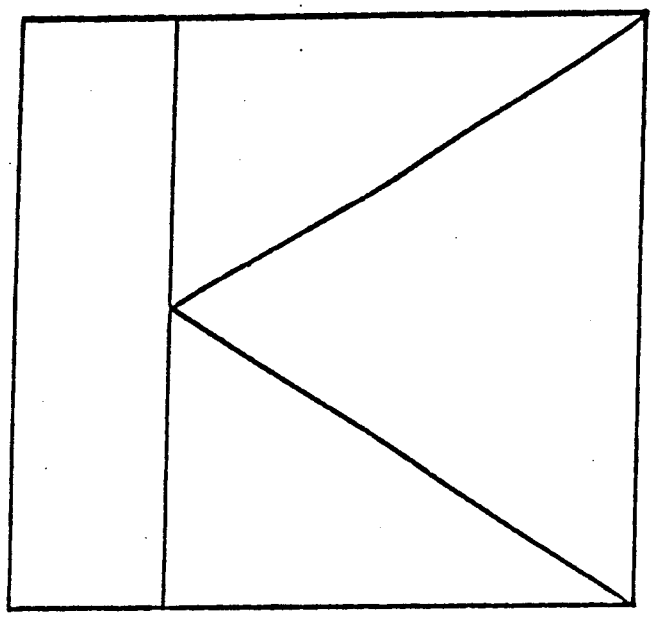
FIG. 15 is a typical diagram showing another manner of setting sampling areas on an image sensed picture.

Furthermore, although sampling areas are set in a manner shown in FIGS. 2 and 5, the sampling areas may be set in a dividing manner as shown in FIG. 15.

Additionally, if areas of the sampling areas are all set to the same, an exposure evaluating value itself can be used for determining an abnormal luminance portion and computing the average density of all the areas without computing the density of each of the sampling areas. However, in this case, the reference value P and the desired value Q must be set to values corresponding to the exposure evaluating value.

As described in the foregoing, according to the fifth embodiment of the present invention, the most suitable gamma correction value is automatically determined based on the picture contrast. In addition, an evaluating value used for exposure control can be utilized as an evaluating value for gamma adjustment without any modification, so that a circuit configuration can be significantly simplified.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An auto iris apparatus responsive to a video signal obtained from image sensing means (1, 3, 4) for automatically adjusting exposure to an object, comprising:
    means (2, 5, 19) for changing exposure to said object,
    means (7, 9, 20), responsive to said video signal, for providing in a time-divisional manner a plurality of sampling areas of an entire sensed image in said video signal,
    exposure evaluating value detecting means (6, 10g, 10h, 10i, 10j, 10k), responsive to said plurality of sampling areas, for detecting a level of a luminance signal in the video signal in each of said plurality of sampling areas and for supplying the level as a first exposure evaluating value in for the corresponding sampling area so as to form a plurality of first exposure evaluating values,
    computing means (34, 52) for weighting with a predetermined first weight one of the first exposure evaluating values corresponding to a particular one of the sampling areas, weighting with a second weight smaller than said first weight each of the first exposure evaluating values corresponding to the sampling areas other than said particular one sampling area, and computing a second exposure evaluating value representing said entire sensed image based on the plurality of weighted first exposure evaluating values,
    means (39), operative in response to the second exposure evaluating value and a predetermined value, for controlling said exposure changing means such that the second exposure evaluating value coincides with the predetermined value,
    means (32) for computing a reference value based on the sum of the first exposure evaluating values supplied from the exposure evaluating value detecting means, and
    means (33, 35, 36, 37, 38) for changing said predetermined value according to a relation between the one first exposure evaluating value corresponding to said particular sampling area and said reference value.

2. The auto iris apparatus according to claim 1, wherein said predetermined value changing means comprises means (33, 35, 36, 378, 38) for selecting a first, second or third predefined value as said predetermined value whenever the first exposure evaluating value corresponding to said particular sampling area is respectively within a predetermined allowable range with respect to said reference value, below said allowable range or above said allowable range, wherein said first pre-defined value is smaller than the third predefined value and larger than the second predefined value.

3. The auto iris apparatus according to claim 1, wherein
    said particular sampling area comprises a sampling area set in a central region of said sensed image.

4. The auto iris apparatus according to claim 1, wherein
    said first weight is 2, and said second weight is 1.

5. An image sensing apparatus for automatically adjusting exposure to an object, comprising:
    image sensing means (1, 3, 4) having a lens and an image sensor for generating a video signal in response to incident light from said object,
    means (2, 5, 19) for changing exposure to said object,
    means (7, 9, 20), responsive to said video signal, for providing in a time-divisional manner a plurality of sampling areas of an entire sensed image in said video signal,
    exposure evaluating value detecting means (6, 10g, 10h, 10i, 10j, 10k), responsive to said plurality of sampling areas, for detecting a level of a luminance signal in the video signal in each of said plurality of sampling areas and for supplying the level as a first exposure evaluating value in for the corresponding sampling area so as to form a plurality of first exposure evaluating values,
    computing means (34, 52) for weighting with a predetermined first weight one of the first exposure evaluating values corresponding to a particular one of the sampling areas, weighting with a second weight smaller than said first weight each of the first exposure evaluating values corresponding to the sampling areas other than said particular one sampling area, and computing a second exposure evaluating value representing said entire sensed image based on the plurality of weighted first exposure evaluating values, means (39), operative in response to the second exposure evaluating value and a predetermined value, for controlling said exposure changing means such that the second exposure evaluating value coincides with the predetermined value, means (32) for computing a reference value based on the sum of the first exposure evaluating values supplied from the exposure evaluating value detecting means, and means (33, 35, 36, 37, 38) for changing said predetermined value according to a relation between the one first exposure evaluating value corresponding to said particular sampling area and said reference value.

6. The image sensing apparatus according to claim 5, wherein said predetermined value changing means comprises means (33, 35, 36, 37, 38) for selecting a first, second or third predefined value as said predetermined value whenever the first exposure evaluating value corresponding to said particular sampling area is respectively within a predetermined allowable range with respect to said reference value, below said allowable range or above said allowable range, wherein said first pre-defined value is smaller than the third predefined value and larger than the second predefined value.

7. The image sensing apparatus according to claim 5, wherein said particular sampling area comprises a sampling area set in a central region of said sensed image.

8. The image sensing apparatus according to claim 5, wherein said first weight is 2, and said second weight is 1.

* * * * *